United States Patent
Matthews et al.

(10) Patent No.: US 7,305,576 B2
(45) Date of Patent: *Dec. 4, 2007

(54) SYSTEM AND METHOD FOR RE-ROUTING FAILED VIDEO CALLS

(75) Inventors: Gordon H. Matthews, Austin, TX (US); James H. Stephens, Jr., Austin, TX (US)

(73) Assignee: Tandberg Telecom AS, Lysaker (NO)

( * ) Notice: Subject to any disclaimer, the term of this patent is extended or adjusted under 35 U.S.C. 154(b) by 0 days.

This patent is subject to a terminal disclaimer.

(21) Appl. No.: 11/429,313

(22) Filed: May 8, 2006

(65) Prior Publication Data

US 2006/0200695 A1 Sep. 7, 2006

Related U.S. Application Data

(63) Continuation of application No. 10/062,122, filed on Jan. 31, 2002, now Pat. No. 7,076,684.

(51) Int. Cl.
*G06F 11/00* (2006.01)
(52) U.S. Cl. ............... 714/4; 714/13; 709/221
(58) Field of Classification Search ........ None
See application file for complete search history.

(56) References Cited

U.S. PATENT DOCUMENTS

| | | | |
|---|---|---|---|
| 5,828,847 A | 10/1998 | Gehr et al. | |
| 6,604,137 B2 | 8/2003 | Cowan et al. | |
| 6,621,515 B2 | 9/2003 | Matthews et al. | |
| 2003/0037283 A1 | 2/2003 | Srinivasan et al. | |
| 2003/0061319 A1 | 3/2003 | Manzardo | |
| 2003/0167418 A1 | 9/2003 | Zhu et al. | |
| 2004/0172574 A1 | 9/2004 | Wing et al. | |
| 2005/0086556 A1* | 4/2005 | Zhu et al. ............ | 714/4 |

* cited by examiner

*Primary Examiner*—Yolanda L Wilson
(74) *Attorney, Agent, or Firm*—Oblon, Spivak, McClelland, Maier & Neustadt, P.C.

(57) ABSTRACT

A system and method for re-routing a failed video call schedules one or more reserve video devices for use in the event of failure of the video devices selected to support a video call. Upon detection of a failure of a video device, the video network platform re-establishes the video call by using the reserve video devices to replace the failed video device, thus avoiding the waste of video network resources and delays in the completion of a video call. More efficient use of reserve video devices is obtained by pooling the reserve video devices with a reserve video network that supports plural primary video networks.

16 Claims, 1 Drawing Sheet

SYSTEM AND METHOD FOR RE-ROUTING FAILED VIDEO CALLS

CROSS-REFERENCE TO RELATED APPLICATION

The present continuation application claims the benefit of priority under 35 U.S.C. §120 to Application Ser. No. 10/062,122, filed Jan. 31, 2002 now U.S. Pat. No. 7,076,684, the entire contents of which are hereby incorporated herein by reference.

TECHNICAL FIELD OF THE INVENTION

This invention relates generally to video communication networks, and more specifically relates to a system and method for re-routing a failed video call.

BACKGROUND OF THE INVENTION

Video calls provide an excellent forum for meetings between participants who cannot travel to meet in one location. By capturing both audio and visual presentations of participants, video calls are often the next best thing to a personal meeting in one location. Advances in computer and networking technology have greatly reduced the expense of conducting video calls and maintaining a video network. Thus, complex video calls between a large number of participants have grown more common as a medium for conducting large scale business meetings.

Although video calls are an excellent alternative to in-person meetings, the scheduling, configuration and set-up of a video call is often a complex task that becomes increasingly complex as the number of participants in the video call increases. For instance, video calls involving three or more endpoints typically must be routed through a multi call unit (MCU) or several MCUs with each endpoint routed through an MCU port in order to coordinate presentation of the video call. As another example, if video endpoints use different protocols, then a gateway device is generally needed to establish and maintain communications between the endpoints. In addition, conventional video networks which involved hardware MCU and gateway assets are incorporating video over internet protocol technology so that MCU and gateway functions are also performed by servers routing TCP/IP packets.

Once a configuration for a complex video call between a large number of video endpoints is established, the hardware and software assets for supporting the video call typically are scheduled for the video call in advance and set aside so that others will not use the assets. For instance, technical staff that oversees the assets and the network bandwidth will make the video devices inaccessible to unauthorized users and will set aside bandwidth to support the video call, either through a local video network or through third party networks such as the Public Switched Telephone Network (PSTN), private networks or the Internet. This process of scheduling video devices tends to decrease the usefulness of video call networks since other ad hoc video meetings are more difficult to establish if assets are tied-up by scheduling in advance.

The complexity associated with configuring and setting up a video call have led to some hesitation by users for the wide spread adoption of video communications. Another related difficulty that has slowed the acceptance of video calls is that video devices are sometimes unreliable. The more complex the proposed video call, the more likely that a failure of a video device or the video network will disrupt the video call. For instance, if a video call is configured through three MCU devices, then the failure of a single MCU device may prevent the completion of the video call and the goal of the participants of the video call. As another example, failure of portions of a video network may result in reduction of available bandwidth so that the quality of a video conference is dramatically affected to the point of degradation of the purpose of the video call. In such instances, the participants of the video call generally must reschedule the call or find available assets to support reconfiguration of the call. However, even if assets are available to reconfigure the video call, a significant delay in the video call is typically introduced as the call is reestablished, often degrading the purpose of the call and the advantage of a video call over a personal meeting of regular audio telephone conference call.

SUMMARY OF THE INVENTION

Therefore a need has arisen for a system and method which re-routes a video call to overcome a failure in the video network that degrades the video call.

A further need has arisen for a system and method which schedules reserve video network assets to avoid degradation of a video call if a failure of the video network occurs during the video call.

In accordance with the present invention, a system and method are provided which substantially reduces the problems and disadvantages of configuring and scheduling video devices for a video call across a video network. Reserve video devices are scheduled for use in the event of failure of primary video devices used in a video call configuration. Upon detection of failure of a primary video device, the video call is re-routed from the failed video device through the reserve video device. In this manner, a pool of resources are actively managed and scheduled to more effectively maintain video network communications.

More specifically, a video network platform interfaces with a video network to monitor, schedule and optimize video network performance. A schedule configuration engine configures a video call with selected video devices and schedules the video devices for the call at the desired time. The schedule configuration engine also schedules one or more reserve video devices for use in the event of failure of one or more of the selected video devices. A video device controller initiates a video call as configured by the schedule configuration engine and monitors the call to ensure that video devices work properly. Upon detection of a failure of a video device, the video device controller re-routes the video call from the failed video device and through the reserve video device.

In one embodiment, a scheduling platform associated with a pool of reserve resources provides improved flexibility for scheduling reserve video devices. For instance, a scheduling platform associated with third party video devices acts as an external bridging system to provide reserve video devices for a configured video call. A video device controller of the scheduling platform negotiates with the video device controller of the video network platform to schedule video devices as reserve video devices and to activate those reserve video devices upon failure of a primary video device. For example, a video network platform having two scheduled video calls that each use an MCU may schedule a reserve MCU in case either one of the two primary MCUs fail. As a further example, the scheduling platform may divide the allocation of a reserve MCU over a given time period between several different MCUs so that maintaining a reserve does not unnecessarily tie up available assets. If a failure occurs, the scheduled reserve video device is made available to the video network platform and is used to maintain the video call.

In one embodiment, video devices are scheduled to support video calls and unscheduled video devices are placed in a reserve pool accessed by the schedule configuration engine. The reserve pool of video devices is used to provide primary video devices for newly-scheduled video calls and also provide reserve video devices for scheduled video calls by establishing alternative schedules that account for primary video device failures. The schedule configuration engine determines if the reserve pool is adequate to ensure a desired level of video call reliability, such as by modeling reliability. If a desired degree of reliability requires a larger pool of reserve video devices, the schedule configuration engine cooperates with the video device controller to negotiate for additional reserve video devices, such as from external bridging companies. The pool of reserve video devices is dynamic in nature so that as reserve devices are called upon, the reserve pool is re-allocated and added to as necessary to maintain a desired level of reliability.

The present invention provides a number of important technical advantages. One important technical advantage is that the reliability of video of calls, especially complex video calls involving greater numbers of video devices, is improved by scheduling reserve video devices to replace video devices that fail. The video network platform automatically maintains or re-establishes a configured video call in the event of a video device failure without wasting time searching for available reserve devices. The video device controller automatically maintains an adequate reserve of video devices for configured video calls so that, upon detection of a video device failure, the disruption of the established video calls is minimized.

Another important technical advantage of the present invention is that video device resources are more efficiently used. For instance, reserve video devices scheduled in case of failure reduce the risk that a configured video call will be wasted if a video device failure occurs. Video calls may be prioritized to ensure that the most important video calls are completed and the scheduling of reserve video devices may take into consideration probabilities of failure for primary video devices to help ensure that adequate reserve video devices are available. Automatic negotiations with third party bridging services maintain an adequate reserve of video devices to avoid extended disruptions of video call service.

Another important technical advantage of the present invention is that an administrator of a video network may schedule reserve video devices to accommodate potential failures in the video network. The availability of third party video devices as reserves for a video call allow the administrator to fully utilize video devices associated with the administrator's video network with reduced risk that a failure will disrupt scheduled video calls. This helps to fully utilize available video device resources and reduces wasted assets and the costs of securing outside vendor systems and services.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the FIGURES, like numerals being used to refer to like and corresponding parts of the various drawings.

Scheduling reserve video devices to back-up video calls in case of failure of primary video devices helps to reduce video call failure, especially with complex video calls that span many devices. However, maintaining video devices on reserve can result in valuable video device assets sitting idle when no failures occur. A schedule configuration engine according to the present invention reduces the expense of maintaining reserve video devices and increases video call reliability by scheduling reserve devices based on projected failures and relying on third party devices outside of the video network to act as the reserve devices.

Figure 1:
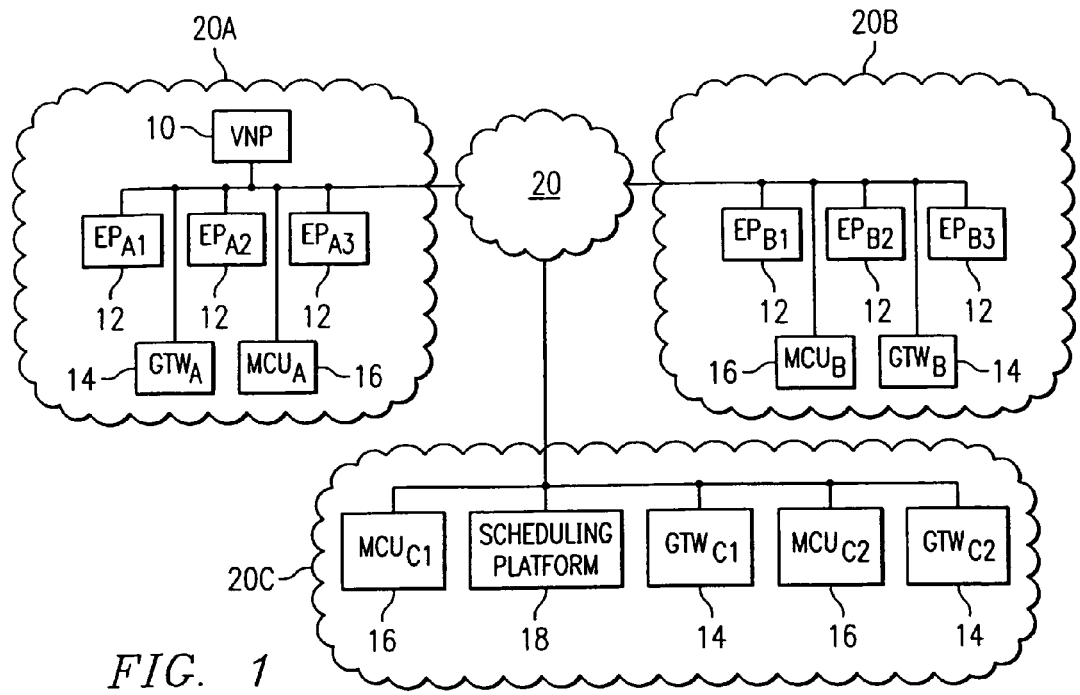
FIG. 1 depicts a block diagram of a video network operable to re-route failed video calls.

Referring now to FIG. 1, a block diagram depicts a video network having plural video devices interfaced to support video calls. A video network platform 10 controls video endpoints 12, gateways 14 and MCUs 16 deployed within a video network 20A. A video network 20B interfaces with network 20A, such as through a telecommunications network 20, like the public switched telephone network or the internet. A scheduling platform 18 controls gateways 14 and MCUs 16 in a video network 20C that interfaces with video networks 20A and 20B through network 20.

Video network platform 10 configures, schedules and controls video calls within its local video network 20A. For instance, video network platform 10 may configure a video call between endpoints A1, A2 and A3 using MCU A and gateway A without accessing other devices through network 20. Video network platform 10 may establish a video call using video devices from video network 20B and video network 20C by communicating with those video devices through network 20. As an example, video network platform 10 may establish a video call between endpoints A1, A2, B1 and B2 supported with one of MCUs A, B, C1 or C2 by sending a command to the respective MCU to initiate a video call to each end point. However, failure of the MCU will lead to failure of the video call.

In order to reduce the risk that a failure of a video device will lead to failure of a video call, video network platform 10 configures a video call with selected video devices and also schedules one or more reserve video devices for use in the event of failure of one or more of the selected video devices. For example, video network platform 10 configures, schedules and initiates a video call between endpoints A1, A2 and B1 through MCU A and reserves MCU C1 in the case of failure of MCU A. If, during the video call, MCU A fails, then video network platform 10 re-initiates the video call using MCU C1. Depending upon the type of video network, re-initiation of the video call might involve re-dialing the endpoints through the reserve MCU or re-routing TCP/IP packets through a server performing MCU functionality.

Figure 2:
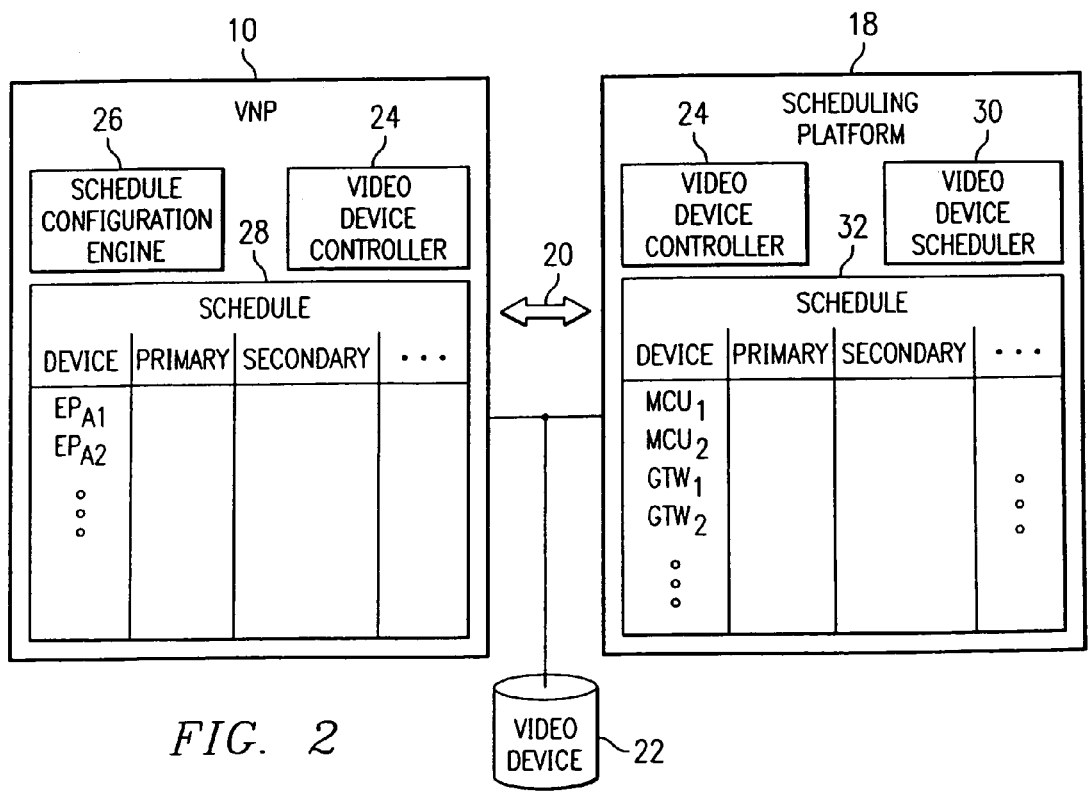
FIG. 2 depicts a block diagram of a video network platform and scheduling platform for coordinating reserve video devices.

Referring now to FIG. 2, the block diagram depicts that video network platform 10 and scheduling platform 18 interface through network 20 to coordinate the scheduling of primary and reserve video devices. A video device controller 24 supports control of local video devices by video network platform 10 and scheduling platform 18, such as initiating or terminating video calls at MCU or gateway devices. A schedule configuration engine 26 schedules video devices for video calls initiated or controlled by video network platform 10. A schedule 28 tracks the scheduled video calls for each video device, including its primary and secondary schedules. A video device scheduler 30 tracks the schedule for video devices associated with scheduling platform 18, such as MCUs and gateways of video network 20C. A scheduling platform schedule 32 tracks the video devices associated with video network 20C, including their primary and secondary scheduling activities. A device database 22 stores information for the video devices such as address information, functionality information, and reliability information.

In operation, a user initiates configuration of a video call through selection of endpoints. Schedule configuration engine 26 schedules primary video devices to support the video call, including the MCU and gateway devices, and also schedules reserve video devices to replace primary devices in the event of failure. Reserve devices may be selected from video network 20A associated with video network platform 10 or selected from video network 20C through coordination of video device scheduler 30 and schedule configuration engine 26 communicating through video device controllers 24. Should a video device fail, video device controller 24 detects the failure and activates the scheduled reserve device to replace the failed primary video device. Schedule configuration engine 26 schedules reserve devices based in part on the historical reliability of scheduled video devices stored in video device library 22. Thus, a predetermined video call reliability is obtainable by scheduling a reserve video devices as a pool for multiple primary video devices and multiple video calls. Should a reserve video device be called upon to replace a failed video device, video device scheduler 30 in coordination with schedule configuration engine 26 re-assigns the remaining primary video devices to a different reserve device.

In one embodiment, schedule configuration engine 26 provides a predetermined level of reliability while supporting full utilization of network 20A video devices by using a third party network 20C to provide reserve video devices. The use of a third party pool of reserve video devices allows more efficient use of video devices of video network 20A by spreading the risk of video device failure over a greater number of video networks that rely on the reserve pool of video devices. The scheduling is coordinated between schedule configuration engine 26 and video device scheduler 30 through video device controllers 24. If a failure is detected, the video call is re-routed through the third party reserve video device.

One advantage of the present invention is that the use of a third party pool of reserve video devices allows a video network to more efficiently use video devices in a primary role by relying on the third party pool to provide a predetermined reliability by assigning an appropriate quantity of reserve video devices. The cost of maintaining the pool of reserve video devices is reduced since that cost may be spread over a number of video networks and spanning a number of video calls. For instance, one or more primary video networks may schedule fractional reserve video devices from a pool, rather than whole video devices, so that the combined scheduled reserve devices are more efficiently allocated as whole devices backing-up several primary video networks. In other words, one reserve device may back-up several primary devices where the risk of failure is acceptably low. As reserve devices are called upon to replace failed primary devices, the quantity of reserve devices needed to obtain a desired degree of reliability may be re-calculated by video device scheduler 30 and the pool increased or decreased as needed. Moreover, the degree of reliability may be controlled so that video calls having a greater priority are handled with a greater reserve priority, thus ensuring the highest degree of reliability for those video calls.

Although the present invention has been described in detail, it should be understood that various changes, substitutions and alterations can be made hereto without departing from the spirit and scope of the invention as defined by the appending claims.

What is claimed is:

1. A system for re-establishing failed video calls through a video network having plural video devices, the system comprising:
   a schedule configuration engine operable to schedule video devices as primary video devices that support a video call and reserve video devices that replace failed primary devices, and to determine a quantity of reserve video devices that provide a predetermined reliability level for the video call based in part on a probability of failure of the primary video devices; and
   a video device controller interfaced with the schedule configuration engine and the video devices, the video device controller operable to detect a primary video device failure and to activate a reserve video device scheduled to replace the failed primary video device.

2. The system of claim 1, further comprising:
   a reserve video network interfaced with the plural video devices, the reserve video network having plural video devices available for scheduling for use by the video device controller and
   a reserve video device controller interfaced with the reserve video network and communicating with the video device controller to negotiate control of reserve video network devices by the video device controller.

3. The system of claim 1, wherein the schedule configuration engine is operable to reserve video devices from the reserve video network if the plural video network devices are inadequate to achieve the desired reliability level.

4. The system of claim 1, wherein the video devices comprise an MCU.

5. The system of claim 1, wherein the video devices comprise a gateway.

6. The system of claim 1, wherein the video devices comprise network bandwidth for transferring video call information.

7. The system of claim 1, wherein a failure is a network interruption.

8. The system of claim 1, wherein the routing module is further operable to enable end-to-end call routing.

9. A method for re-establishing a failed video call over a video network having plural video devices, the method comprising:
   configuring a video call with selected video devices;
   determining a quantity of reserve video devices that provide a predetermined reliability level for the video call based in part on a probability of failure of the selected video devices;
   scheduling one or more of the reserve video devices for use in the event of failure of one or more of the selected video devices;
   detecting failure of one of the selected video devices; and re-establishing the video call from the failed video device through the one or more of the reserve video devices.

10. The method of claim 9, further comprising:
determining that an inadequate quantity of reserve video devices are scheduled to achieve the predetermined level of reliability; and
negotiating additional reserve video devices from a reserve network.

11. The method of claim 9, further comprising:
detecting a video call failure associated with a video device failure; and
re-establishing the video call with the one or more reserve video devices to replace the video device failure.

12. The method of claim 11 further comprising:
re-determining the quantity of reserve video devices to achieve the predetermined level of reliability for the scheduled plural video calls in light of the video device failure; and
scheduling the re-determined quantity of reserve video devices.

13. The method of claim 12 further comprising:
determining that an inadequate quantity of reserve video devices are scheduled to achieve the predetermined level of reliability; and
negotiating additional reserve video devices from a reserve network.

14. The method of claim 9, wherein a failure is a network interruption.

15. The method of claim 9, wherein the routing module is further operable to enable end-to-end call routing.

16. A method for scheduling a video call, the method comprising:
determining a video call configuration for the video call, the video call configuration having plural video devices;
identifying one or more video devices as susceptible to failure;
identifying one or more video devices as reserve video devices to support the video call in the case of failure of the susceptible video device;
scheduling the video devices and the reserve video device for the video call,
scheduling a first reserve video device for a first portion of the video call; and
scheduling a second reserve video device for a second portion of the video call.

* * * * *